Figure 3:
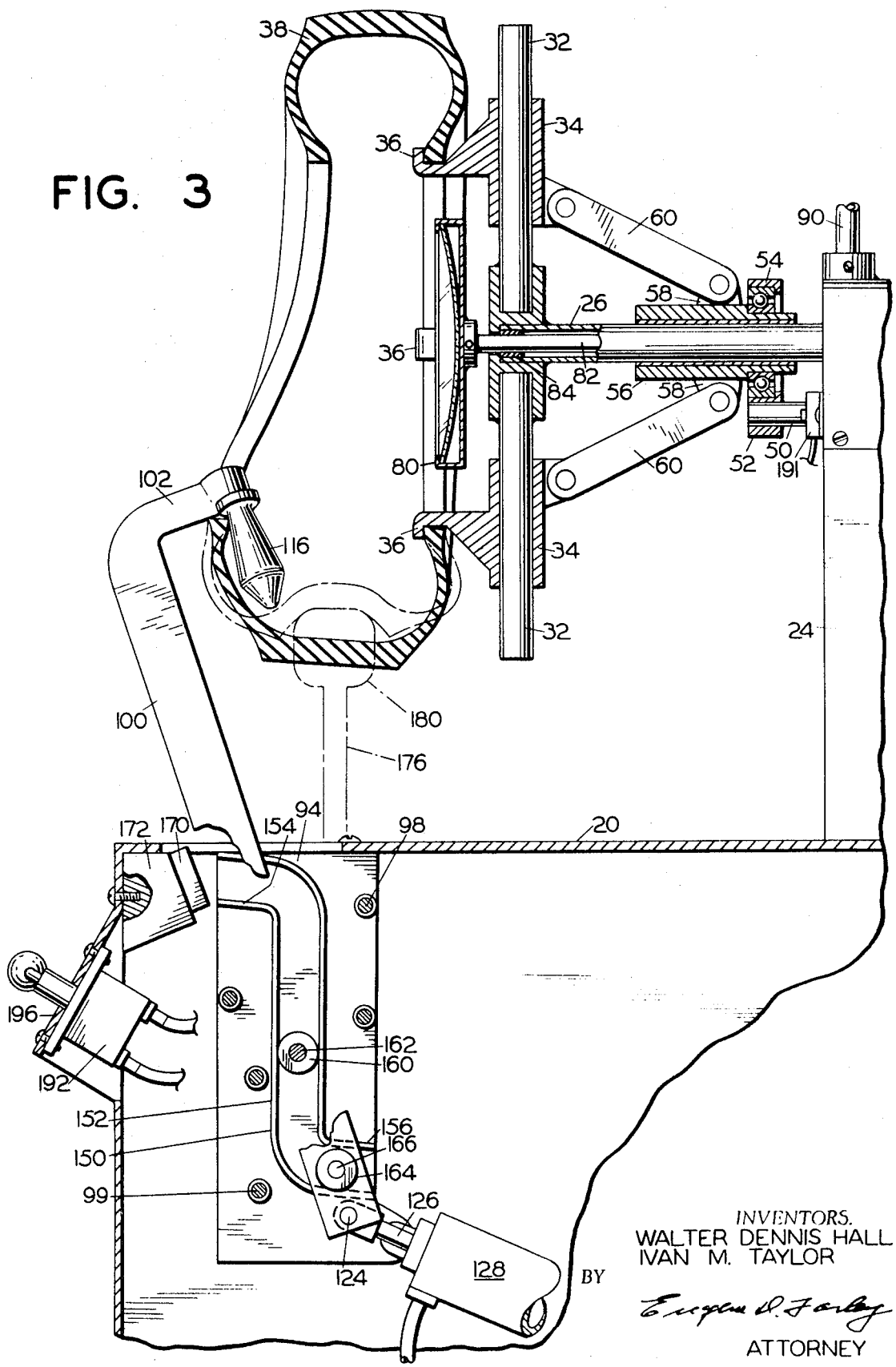

United States Patent [11] 3,583,674

[72] Inventors Walter Dennis Hall
  Portland, Oreg.;
  Ivan M. Taylor, Pottsville, Pa.
[21] Appl. No. 715,000
[22] Filed Mar. 21, 1968
[45] Patented June 8, 1971
[73] Assignee Super Mold Corporation

[54] TIRE INSPECTION APPARATUS
  15 Claims, 10 Drawing Figs.
[52] U.S. Cl. .................................................. 254/50.2,
  254/50.3
[51] Int. Cl. .................................................. B60c 25/14
[50] Field of Search .......................................... 254/50.1,
  50.2, 50.3, 50.4; 73/146

[56] References Cited
UNITED STATES PATENTS

| | | | |
|---|---|---|---|
| 1,700,511 | 1/1929 | Page | 143/168UX |
| 1,863,764 | 6/1932 | Prentice | 254/50.2 |
| 1,973,204 | 9/1934 | Goss | 143/168.5UX |
| 3,039,239 | 6/1962 | Banko | 51/165.(40) |
| 3,125,325 | 3/1964 | Sorsen | 254/50.4 |
| 3,130,957 | 4/1964 | Branick | 254/50.3 |

*Primary Examiner*—Robert C. Riordon
*Assistant Examiner*—David R. Melton
*Attorney*—Eugene D. Farley

ABSTRACT: Tire inspection apparatus comprises a rotatably tire mounting cooperating with means for spreading the tire as it rotates. Mirrors are focused on the inside spread area as well as on the outside of the tire for inspection from a single station. A ram indents the tire in the spread location for further stretching the tire and revealing minute defects.

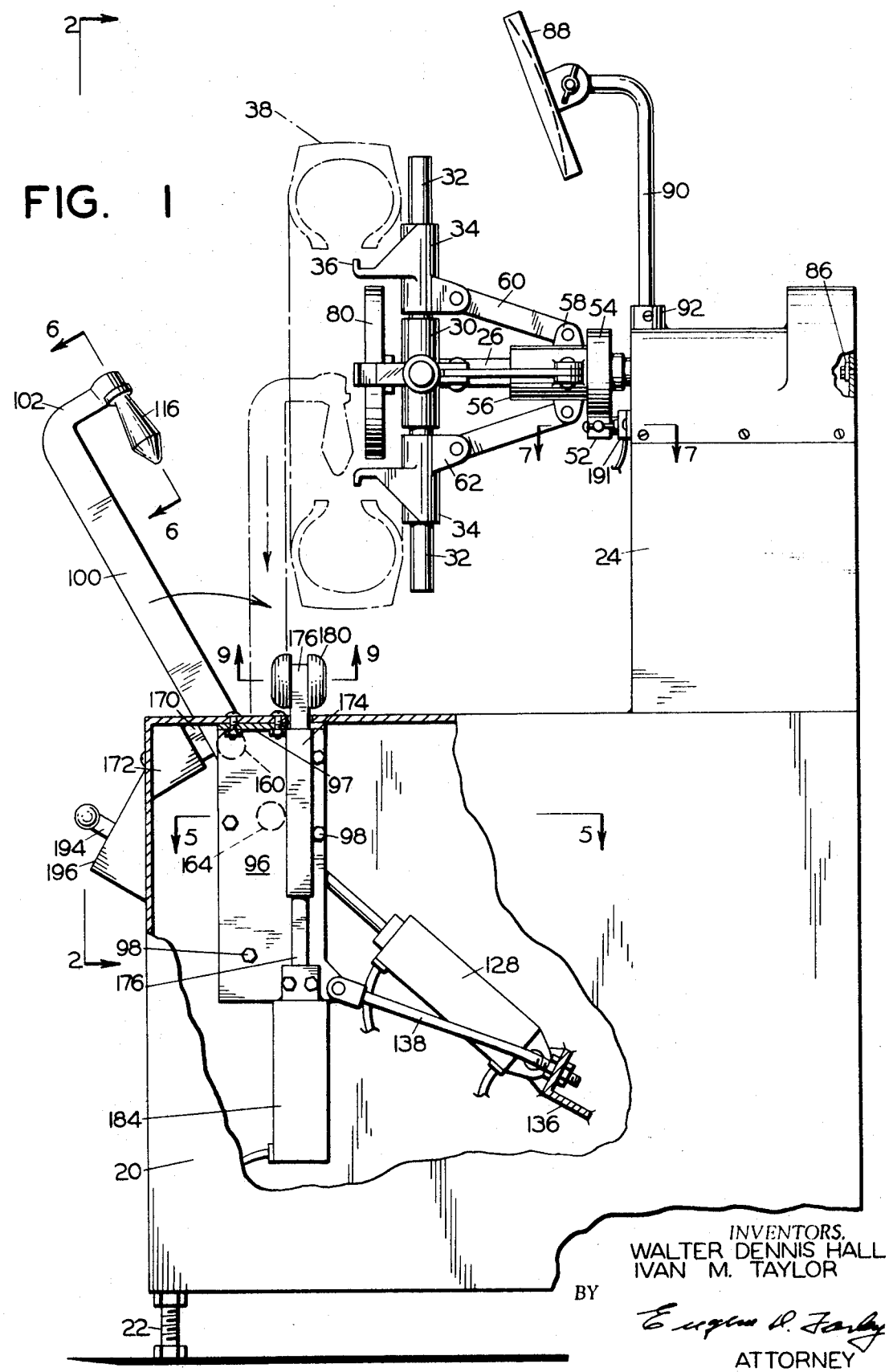

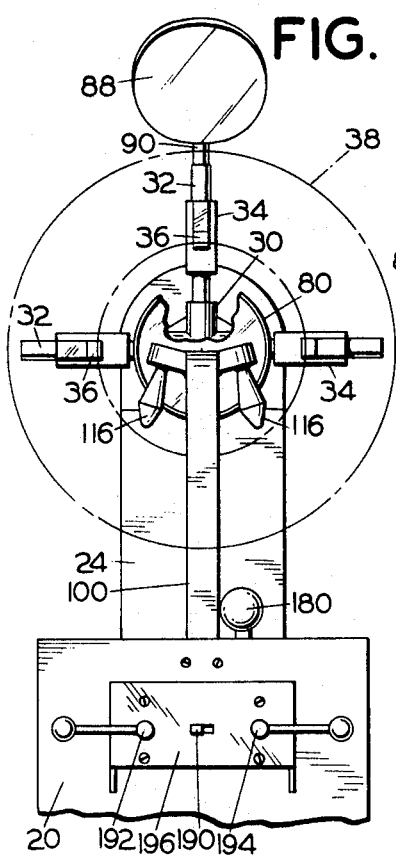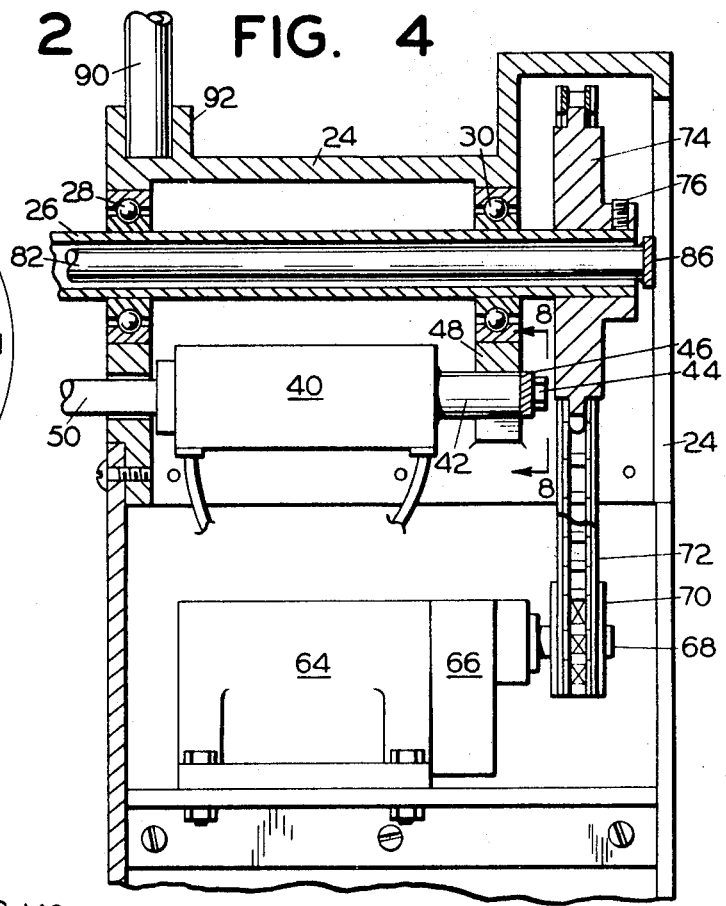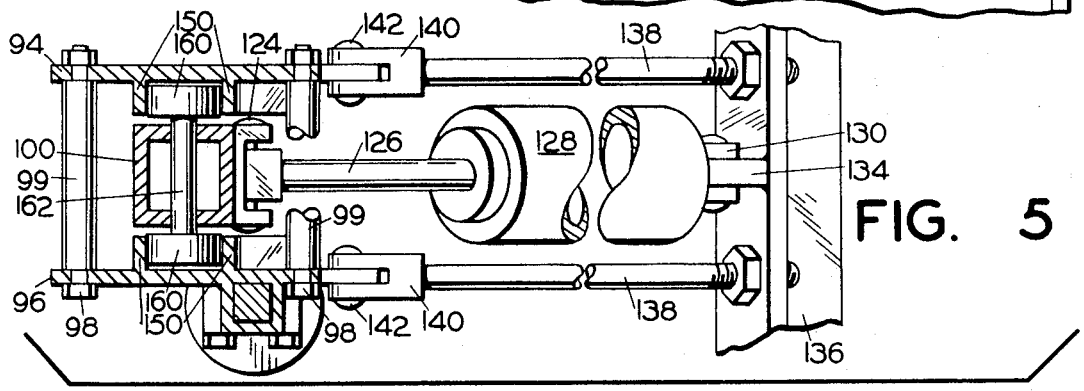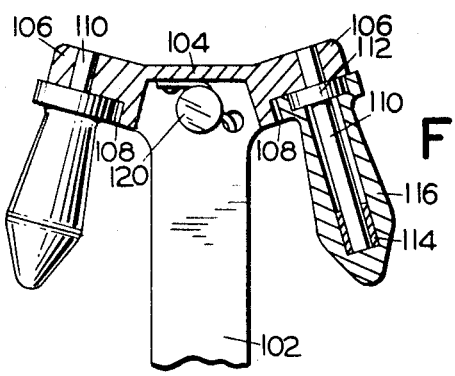

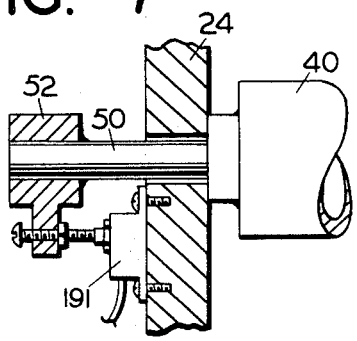
FIG. 7
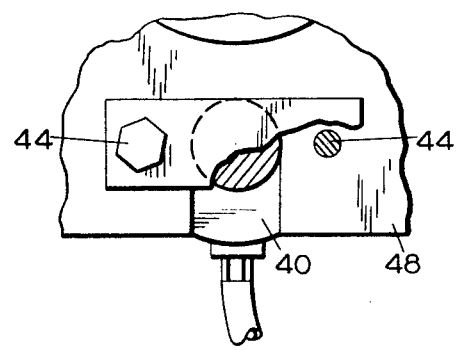
FIG. 8
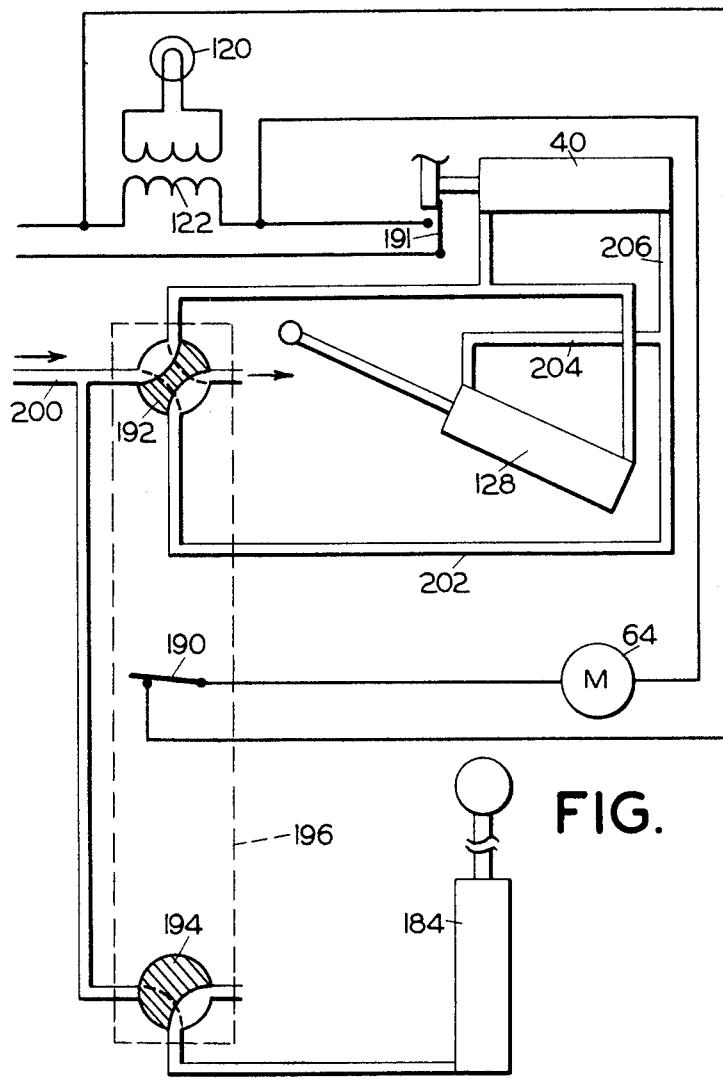
FIG. 10
FIG. 9
INVENTORS.
WALTER DENNIS HALL
IVAN M. TAYLOR
BY
*Eugene D. Farley*
ATTORNEY

TIRE INSPECTION APPARATUS

This invention relates to tire inspection apparatus.

Tire casings being subject to damage by puncture, cutting, abrasion and impact, it frequently is necessary to inspect the casing to ascertain the location and magnitude of the defects preliminary to making necessary repairs and preliminary also to recapping the tire.

It is the general purpose of the present invention to provide tire inspection apparatus which, in contradistinction to the tire inspection apparatus of the prior art, provides significant advantages as follows:

1. It enables the examination simultaneously of all portions of the tire, i.e., the inside sidewall, the outside sidewall, the tread, and the inner surface. This may be done by a single operator from a single-operating station.
2. By using magnifying mirrors and stretching the tire, it enables detection of all tire defects instantly, no matter how small.
3. It accelerates the tire inspection procedure to such a degree that an entire tire may be examined minutely in less than one-half minute.
4. It accommodates all of the common types and sizes of tires, both large and small.
5. It is subject to precise manual control.
6. It mounts the tires easily and without undue effort.
7. It holds the tire securely during the entire inspection procedure.
8. A single valve controls most of the functions of the apparatus.
9. It is simple in construction, easy to operate and relatively inexpensive in cost.

The manner in which the foregoing and other objects of the invention are accomplished will be apparent from the accompanying specification and claims considered together with the drawings, wherein:

FIG. 1 is a view in side elevation of the presently described tire inspection apparatus, illustrated in its rest position with a tire mounted on it, preliminary to inspection, FIG. 2 is a view in front elevation of the apparatus, FIG. 3 is a view in longitudinal section of the apparatus illustrated in its operative position during the tire inspection operation, FIG. 4 is a longitudinal sectional view illustrating the drive of the tire rotating unit of the apparatus, FIG. 5 is a sectional view taken along line 5-5 of FIG. 1 illustrating the drive for the tire spreading unit of the apparatus, FIG. 6 is a detail view, partly in section, taken along line 6-6 of FIG. 1 and illustrating the construction of the tire contacting elements of the tire spreading unit of the apparatus, FIG. 7 is a detail sectional view taken along line 7-7 of FIG. 1 and illustrating the application of an electric control to the drive unit of the apparatus, FIG. 8 is a detail sectional view taken along line 8-8 of FIG. 4 and illustrating the manner of mounting a fluid operated cylinder drive for the unit, and FIG. 9 is a detail sectional view taken along line 9-9 of FIG. 1 and illustrating tire indenting means employed in conjunction with the apparatus of the invention, and FIG. 10 is a schematic diagram of fluid and electric circuits employed in the drive and control of the apparatus, respectively.

Generally stated the tire inspecting apparatus of our invention comprises rotatable mounting means for mounting a tire. Drive means are connected to the rotating means for driving it at a predetermined rotational speed.

Tire spreading means are located for engaging the tire in a selected area and to spread a portion of it apart as it rotates, revealing the inner tire surface. Tire indenting means push the center of the tire inwardly to stretch the tire and make defects more readily apparent. Mirrors, preferred magnifying mirrors, are located strategically with reference to the apparatus so that the operator from a single station can inspect all of the tire surfaces.

Considering the foregoing in greater detail and with particular reference to the drawings it will be apparent that the presently described tire inspection apparatus comprises basically three units: A rotatable tire mounting unit, a tire spreading unit, and a tire indenting unit.

THE TIRE MOUNTING UNIT

The construction of the tire mounting unit is shown particularly in FIGS. 1—4 inclusive.

The unit is supported on a box frame 20 defined by side and top plates and supported on adjustable feet 22. An upright housing 24, also defined by side and top plates, extends upwardly from the upper surface of box frame 20, at the rear portion with reference to the operator's station. This housing mounts the tire supporting unit.

A hollow drive shaft 26, FIGS. 3 and 4 is mounted horizontally and rotatably in bearings 28, 30. The drive shaft extends forwardly toward the operator a substantial distance outside of housing 24.

The outer end of shaft 26 mounts a hub 30. The hub in turn supports a plurality of spaced radially extending arms 32, FIG. 3.

Each of arms 32 mounts a slide 34 formed with an integral dog 36 dimensioned to engage the bend of a tire 38.

Dogs 36 may be moved from their rest positions of FIG. 1 to their tire-engaging, working positions of FIG. 3 by means of a drive consisting of a fluid operated cylinder, preferably a double acting pneumatic cylinder 40, FIG. 4. The case of the cylinder is provided with a rearwardly extending projection 42 which is secured by a bolt 44 to the cross piece 46 of a yoke-shaped bracket 48 on housing 24, FIG. 8.

The piston rod 50 of cylinder 40 extends forwardly through an opening in housing 24. It is welded in a sleeve 52 mounted on the outer stationary race of a bearing 54. The inner rotating race of bearing 54 is fixed to a thrust yoke 56 which slides longitudinally on shaft 26 and revolves with it.

Thrust yoke 56 mounts ears 58 to which one of the ends of thrust bars 60 pivotally are secured. The other of the ends of thrust bars 60 pivotally are connected to tabs 62 fixed to dog-mounting slides 34.

Accordingly, as the piston rod of cylinder 40 reciprocates between its retracted position of FIG. 1 and its extended position of FIG. 3, dogs 36 are shifted to their tire-engaging positions.

A suitable drive means is provided for rotating the entire assembly mounting the tire at a predetermined inspection speed. The drive is illustrated particularly in FIG. 4.

A rotary electric motor 64 is bolted to the floor of housing 24. It drives a gear reducer 66, the shaft 68 of which bears a sprocket 70. Sprocket 70 engages a chain 72 which also engages a sprocket 74 fixed to drive shaft 26 by means of set-screw 76. Thus the drive shaft is driven at a rate commensurate with the speed of motor 64.

As the tire rotates, inspection is facilitated by means of strategically arranged mirrors which preferably have a magnifying power from 3 to 5 times.

A first such mirror 80, FIG. 3, is fixed to the outer end of a stationary rod 82. This rod is received centrally in hollow drive shaft 26. Its outer end is bushed with bushing 84. Its inner end is welded to a pad 86 which in turn is welded to the inner surface of one of the plates comprising housing 24.

A second mirror 88 is adjustably mounted on the outer end of an angular standard 90, the inner end of which is received in a socket 92 on the top plate of housing 24.

Mirror 80 is arranged to reveal in magnified degree the spread, inner surface of the tire being inspected. Mirror 88 is arranged to reveal in a correspondingly magnified degree the back sidewall of the tire. Both mirrors readily are visible to an operator standing in front of the apparatus who, of course, is able to inspect directly the front sidewall of the tire without the aid of a mirror. Thus all of the surfaces of the tire may be inspected accurately and thoroughly from a single-operator station.

THE TIRE SPREADING UNIT

The tire spreading unit has for its function spreading a portion of the tire as it revolves, so that the entire surface may be inspected more easily and more accurately. Its construction and manner of operation are shown particularly in FIGS. 1, 3 and 5.

Basically considered, the tire spreading unit comprises an elongated arm having a tire-engaging head on its upper end and a reciprocating drive coupled to its lower end. Cam means are provided for directing the reciprocating motion of the arm along paths which engage the head with the tire, spread it, and then release it.

The tire spreading unit is supported on a pair of spaced-apart plates 94, 96 supported by integral flanges 97 bolted to the top plates of box frame 20 and interconnected and spaced apart by means of bolts 98 and spacers 99.

An elongated arm 100 having an upper section 102 bent at right angles, is mounted and works in the housing afforded by plates 96, 98.

The upper end of arm 100 mounts a tire-engaging head the construction of which is shown particularly in FIGS. 3 and 6.

The upper angularly bent segment 102 of arm 100 mounts a crosspiece 104. The enlarged ends 106 of the crosspiece have downwardly directed recesses 108.

Enlarged ends 106 lie at an outwardly diverging angle to the central portion of the crosshead. They mount by means of a press fit the inner ends of spindles 110. The latter in turn mount bearings 112 and bushings 114 which rotatably support-tapered rollers 116.

It is to be noted that rollers 116 are doubly tapered. Their outer portions taper to a point to facilitate engagement with the tire and entry to the FIG. 3 position of the rollers. The upper portions of the rollers are tapered inwardly to assist in spreading the tire to its maximum extent during the inspection period.

The outer end of segment 102 of arm 100 also mounts a light 120. This is a high intensity light operated at a voltage of, for example, 12 volts. It is operated through a transformer 122 from the house line. It illuminates the work in the area of contact of rollers 116 where maximum spreading and stretching occur.

The lower end of arm 100 is pivoted by means of pin 124 to the piston rod 126 of a double-acting fluid-operated cylinder, preferably a pneumatic cylinder 128. The case of cylinder 128 bears a clevis 130 pivotally secured through a pin 132 to a tab 134. The latter is fixed to a crosspiece 136, FIG. 5, of a hanger assembly including rods 138, clevises 140 and pins 142, which mount the hanger assembly on the two projections extending downwardly from arm 100.

The up and down motion of arm 100 and rollers 116, imparted by the action of cylinder 128, is translated into the angular movement necessary to spread the tire by cam means also illustrated particularly in FIGS. 3 and 5.

The housing formed by plates 94, 96 supports a cam indicated generally at 150. It is in the form of a track having a central vertical section 152, an upper horizontal section 154, and a lower horizontal section 156. Sections 154, 156 are disposed in diametrically opposite directions.

Arm 100 is guided along the cam thus provided by means of a first pair of rollers 160 interconnected by an axle 162 which is journaled between opposite sidewalls of arm 100. The second pair of rollers 164 are interconnected by an axle 166 and also follow the guiding surfaces of cam 150.

Rollers 164 are located substantially at the lower end of arm 100. Rollers 160 are spaced inwardly along the arm a substantial distance. The spacing between the rollers is correlated with the relative lengths of segments 152, 154, 156 of the track.

Accordingly, various motions are imparted to arm 100 as required to cause rollers 116 to describe the pathways required during the performance of their functions. During these movements, rollers 160 act as fulcrums to secure angular movement of the arm.

Thus, when the arm is fully extended in its FIG. 1 position, fulcrum rollers 160 are in segment 154 of the cam while guide rollers 164 still are in section 152. As a consequence the arm is swung outwardly around rollers 160 to its FIG. 1 position where it is clear of the tire. However, upon first retracting the cylinder, rollers 160, 164 move downwardly to a location in which both are contained in central segment 152 of the cam. This movement is indicated by the horizontal arrow of FIG. 1. It brings the rollers 116 into direct alignment with the space between the beads of tire 38, i.e., in a position of entering the tire.

Continued retraction of cylinder 128 brings the rollers 116 straight down along the vertical path indicated by the vertical arrow of FIG. 1.

This movement continues until the rolls 116 have entered the interior of the tire. At this point guide rollers 164 enter horizontal segment 156 of the cam while fulcrum rollers 160 still are in the central segment thereof. This swings the arm angularly outwardly in a direction which is the reverse of the direction of the horizontal arrow of FIG. 1. It moves the rolls 116 with considerable force outwardly against the outer sidewall of the tire. The inner sidewall of the tire is retained by dogs 36. Accordingly, the tire is spread to the condition of FIG. 3.

Extension of the cylinder reverses the foregoing sequence of travel paths of spreading rolls 116.

To limit the angular motion of arm 100 to its position of extreme removal from the tire, there is provided a cushion 170, made of rubber or other resilient material, and mounted angularly on a block 172 in side frame 20. It is located in a position in which it engages a central portion of arm 100 when the latter is in its FIG. 1 position.

THE TIRE INDENTING UNIT

The function of the tire indenting unit is to indent it centrally, preferably in the area of spreading, to stretch the substance of the tire and thus exaggerate any defects which may be present, rendering them more easily visible. The construction and manner of functioning of this unit is illustrated particularly in FIGS. 1, 5 and 9.

The outer sidewall of support plate 96 mounts a vertical guide 174 which preferably is square in cross section. Guide 174 houses and guides a square shaft 176.

The outer end of shaft 176 mounts an indenting head assembly, FIG. 9. This includes a cross-shaft or axle 178 and a pair of rollers 180 mounted on bearings 182.

The lower end of shaft 176 is coupled to a single acting, fluid operated cylinder, preferably a pneumatic cylinder 184.

The indenting head is arranged with the plane of rollers 180 parallel to the plane of tire 38. Accordingly, when cylinder 184 is advanced against the rotating, spread tire, it indents the spread over the tire in the manner indicated in FIG. 3. It may be applied momentarily, in this manner or permitted to follow the tire around during the rotational movement of the latter.

OPERATION

The operating sequence of the apparatus is as follows, reference being made particularly to the schematic flow diagram of FIG. 10. This illustrates the condition of the various units of the apparatus in the starting position of FIG. 1.

In operation, the various units are integrated and correlated by means of an electrical circuit including motor 64, a manual on-off switch 190 and a limit microswitch 191; also by means of a fluid (pneumatic) circuit including, cylinders 40, 128 and 184, a four-way fluid control valve 192 which controls simultaneously cylinders 40, 128, and a three-way fluid control valve 194, which controls the operation of cylinder 184. These various control elements are housed in a console 196, shown in FIGS. 3 and 10.

With the units of the apparatus in the position of FIGS. 1 and 10, a tire 38 is lifted manually onto spreading dogs 36. Fluid control valve 192 is moved clockwise to a position 90° advanced from the position shown in FIG. 10.

Compressed air or other fluid thereupon circulates from a source not shown through conduit 200, through the dotted line position of valve 92, through conduit 202, through branch conduit 204 communicating with cylinder 128 ahead of the piston area, and through branch conduit 206 communicating with cylinder 40 behind the piston therein.

Cylinder 128 thereupon retracts, moving arm 100 and spreader rolls 116 through the angular sequence described above until the rollers are placed in spreading engagement with tire 38, as shown in FIG. 3. Also, cylinder 40 advances, pushing yoke 56 to the left as viewed in FIGS. 1 and 3 and spreading dogs 36 into engagement with the inner beads of tire 38.

At this time, or preliminary thereto, master switch 190 is closed. This energizes a circuit including motor 64 and light 120, provided limit switch 191, open at the start of the operation has been closed by the advancing movement of cylinder 40. Microswitch 191 thus serves a safety function in ensuring that motor 64 is not energized, turning the tire and tire holding assembly, until the tire is in its fully mounted stretched position of FIG. 3.

Fluid control valve 194 then may be adjusted from its full line position of FIG. 10 to its dotted line position of that figure. This connects cylinder 184 with a source of fluid under pressure, extending the cylinder and advancing rollers 180 into indenting contact with the central portion of tire 38 in the stretched area, again as shown in FIG. 3. Thus stretched and indented, the tire is revolved about 360° by the continued operation of motor 64.

During this cycle the operator standing in front of the unit watches magnifying mirror 80, which helps him inspect the stretched area, and magnifying mirror 88, which enables him to inspect the back sidewall of the tire. At the same time he is able by direct vision to inspect the front sidewall of the tire.

The complete cycle requires less than half a minute and thus expedites the tire inspecting operation substantially while at the same time greatly improving its efficiency.

It is to be understood that the form of our invention herein shown and described is to be taken as an illustrative example of the same and that various changes in the shape, size and arrangement of parts may be resorted to without departing from the spirit of out invention or the scope of the subjoined claims.

Having thus described out invention, we claim:
1. Tire inspection apparatus comprising
   a. rotatable tire mounting means comprising
      1. a rotatable shaft,
      2. a hub mounted on the shaft,
      3. a plurality of arms radially mounted on the hub,
      4. a plurality of tire-engaging dogs slidably mounted one on each arm and arranged for engaging the inner edge of the tire,
      5. a thrust yoke slidably mounted on the shaft,
      6. a plurality of radially arranged, pivotally mounted, thrust bars interconnecting the yoke and the hub,
      7. first motor means connected to the thrust yoke for reciprocating the same between advanced and retracted positions,
      8. second motor means connected to the shaft for rotating the same, and
   b. tire spreading means engaging the tire and operative to spread a portion of it as it rotates, revealing the inner tire surface for inspection.
2. The tire inspection apparatus of claim 1 wherein the rotatable shaft is hollow and including a fixed bar mounted in the hollow shaft and extending outwardly from the end thereof, and mirror means mounted on the bar centrally of the tire and focused on the inner surface of the spread portion of the tire for revealing defects therein.
3. The tire inspection apparatus of claim 1 wherein the first motor means comprises a fluid operated cylinder.
4. The tire inspection apparatus of claim 1 wherein the second motor means comprises a rotary electric motor and chain and sprocket coupling means coupling the motor to the rotary shaft.
5. The tire inspection apparatus of claim 1 wherein the second motor means comprises a rotary electric motor and including an electric circuit including the motor, and limit switch means positioned for actuation by the yoke and operative to close the electric circuit when the dogs engage the tire only.
6. Tire inspection apparatus comprising
   a. rotatable tire mounting means,
   b. drive means connected to the tire mounting means for rotating the same,
   c. tire spreading means operative to spread a portion of the tire as it rotates, revealing the inner tire surface, the tire spreading means comprising
      1. an elongated arm,
      2. roller means on one end of the arm positioned for engaging the inside edge of the tire,
      3. drive means for reciprocating the arm between extended and retracted positions,
      4. cam follower means on the arm,
   d. cam means engaging the cam follower means and arranged for guiding the arm successively along a first angular path wherein the roller means moves from a position outside the plane of the tire to a position in the plane of the tire but radially spaced therefrom, along a radial path wherein the roller means moves from a position spaced from the tire to one engaging an inside edge of the tire in the normal relaxed condition of the same, and along a second angular path opposite in direction to the first angular path wherein the roller means engaging the tire, moves laterally, thereby spreading the tire and revealing the inner surface thereof.
7. The tire inspection apparatus of claim 6 wherein the roller means comprises a crosshead mounted on the end of the arm, a pair of axles mounted one on each side of the end of the crosshead at a predetermined angle of divergence to each other and a pair of tapered rollers journaled one on each of the axles.
8. The tire inspection apparatus of claim 6 wherein the cam means comprises an elongated track formed in a central section and two terminal sections disposed substantially normal to the central section but extending in opposite directions, and wherein the cam follower means comprises a pair of spaced rollers rotatably mounted on the arm, one adjacent the end of the arm which is coupled to the drive means and the other being rotatably mounted on the arm a spaced distance inwardly from the first, the second roller acting as a fulcrum for securing angular movement of the arm as the rollers selectively enter the track segments.
9. The tire inspection apparatus of claim 6 wherein the drive means comprises a fluid operated cylinder pivotally coupled to the end of the arm.
10. Tire inspection apparatus comprising:
    a. a frame,
    b. rotatable tire mounting means on the frame arranged to engage one bead of a tire for supporting the latter for rotation,
    c. drive means connected to the tire mounting means for rotating the same, and
    d. tire spreading means on the frame arranged to engage the opposite bead of the tire and operative to spread a portion of it apart as it rotates, revealing the inner tire surface.
11. The tire inspection apparatus of claim 10 including mirror means mounted centrally of the tire mounting means and focused on the inner surface of the spread portion of a tire for revealing defects therein.
12. The tire inspection apparatus of claim 11 including second mirror means mounted behind the tire with reference to the operator's station and focused on the rear outer surface thereof for revealing defects therein, both mirror means being visible to the operator from a single-operating station.
13. The tire inspection apparatus of claim 10 including tire indenting means on the frame stationed outside the periphery of the tire and operable to indent the tire in the spread area.

14. The tire inspection apparatus of claim 13 wherein the tire indenting means comprises ram means positioned radially with respect to the tire, and fluid operated cylinder drive means connected to the ram means for alternating the same between an advanced position wherein it indents the tire and a retracted position wherein it is removed from the tire.

15. The tire inspection apparatus of claim 14 wherein the tire indenting means comprises a shaft angular in cross section arranged radially with respect to the tire, a guideway angular in cross section receiving the ram means in nonrotatable sliding relation, fluid operated cylinder means coupled to the outer end of the ram means for reciprocating it between the tire indenting and retracted positions, a shaft arranged transversely on the outer end of the ram means, and a pair of rollers rotatably mounted on the ends of the shaft and arranged with the plane of rotation of the rollers parallel to the plane of rotation of the tire.